US008144137B2

(12) United States Patent
Hashimoto

(10) Patent No.: US 8,144,137 B2
(45) Date of Patent: Mar. 27, 2012

(54) DISPLAY PANEL DRIVER FOR REDUCING HEAT GENERATION THEREIN

(75) Inventor: Yoshiharu Hashimoto, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 977 days.

(21) Appl. No.: 11/608,043

(22) Filed: Dec. 7, 2006

(65) Prior Publication Data

US 2007/0126722 A1 Jun. 7, 2007

(30) Foreign Application Priority Data

Dec. 7, 2005 (JP) ................................ 2005-353286

(51) Int. Cl.
*G06F 3/038* (2006.01)

(52) U.S. Cl. ........................................ 345/204; 345/100

(58) Field of Classification Search ............ 345/98–100, 345/204

See application file for complete search history.

(56) References Cited

U.S. PATENT DOCUMENTS

| | | | | |
|---|---|---|---|---|
| 5,995,073 A * | 11/1999 | Isami et al. | ..................... | 345/89 |
| 6,448,836 B2 * | 9/2002 | Kokubun et al. | .............. | 327/307 |
| 2002/0180717 A1 * | 12/2002 | Ishiyama | ...................... | 345/204 |
| 2003/0146788 A1 * | 8/2003 | Maki | ............................ | 330/255 |
| 2005/0134537 A1 * | 6/2005 | Tobita | ............................ | 345/87 |
| 2006/0006928 A1 * | 1/2006 | Utsuno | ......................... | 327/541 |
| 2006/0050065 A1 * | 3/2006 | Maki | ............................ | 345/204 |
| 2006/0290636 A1 * | 12/2006 | Hong | ............................. | 345/98 |
| 2007/0018939 A1 * | 1/2007 | Chen et al. | .................... | 345/100 |

FOREIGN PATENT DOCUMENTS

| | | | |
|---|---|---|---|
| JP | 7319432 | A | 12/1995 |
| JP | 10-62744 | A | 3/1998 |
| JP | 2000-206940 | A | 7/2000 |
| JP | 2001-4974 | A | 1/2001 |
| JP | 2002-169501 | A | 6/2002 |
| JP | 2003-22056 | A | 1/2003 |
| WO | WO 96/16347 | A1 | 5/1996 |

OTHER PUBLICATIONS

Office Action issued Jul. 15, 2011 from the Japanese Patent Office in counterpart Japanese application No. 2005-353286.

* cited by examiner

*Primary Examiner* — Chanh Nguyen
*Assistant Examiner* — Long D Pham
(74) *Attorney, Agent, or Firm* — Sughrue Mion, PLLC

(57) ABSTRACT

A display panel drive circuit is provided with a first display output terminal to be connected with a data line of a display panel, first and second output stages, and a control circuit. The first output stage is directly connected with the first display output terminal and configured to output a data signal with the positive polarity with respect to a standard voltage level. The second output stage is also directly connected with the first display output terminal and configured to output a data signal with the negative polarity with respect to the standard voltage level. The control circuit controls the first and second output stages so that one of the first and second output stages is selectively activated while the other of the first and second output stages is deactivated.

10 Claims, 16 Drawing Sheets

Fig. 15A
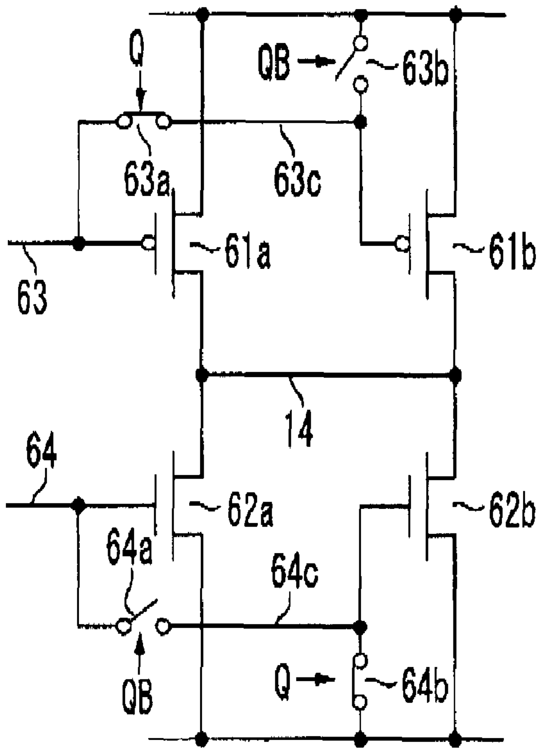
Fig. 15B
| D7 | DRIVE CAPACITY | CURRENT LEVEL OF THE CONSTANT CURRENT |
|---|---|---|
| 1 | n×K | J/m |
| 0 | K | J |
Fig. 15C
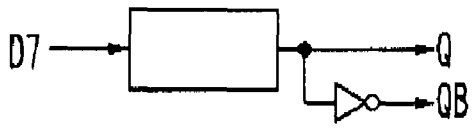

Fig. 16A
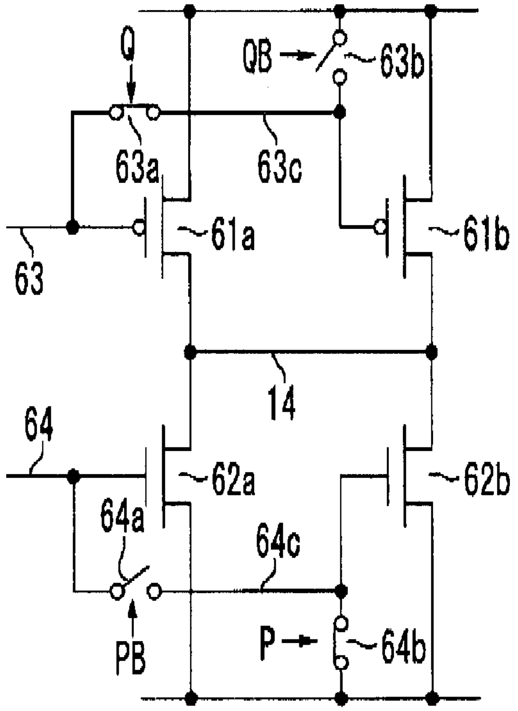
Fig. 16B
| D7 | D6 | DRIVE CAPACITY | CURRENT LEVEL OF THE CONSTANT CURRENT |
|---|---|---|---|
| 1 | 1 | n×K | J/m |
| 1 | 0 | n×K | J |
| 0 | 1 | K | J/m |
| 0 | 0 | K | J |
Fig. 16C
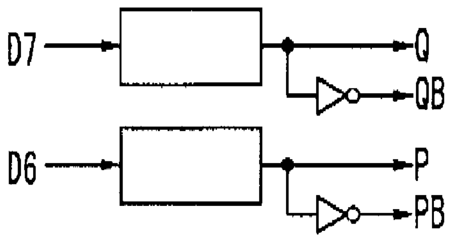

DISPLAY PANEL DRIVER FOR REDUCING HEAT GENERATION THEREIN

BACKGROUND OF THE INVENTION

1. Field of the Invention

The present invention relates to a driver circuit of a display device, more particularly to a technique for reducing heat generation within a data line driver circuit which drivers a display panel by the dot inversion drive technique.

2. Description of the Related Art

The matrix type display panel, in which pixels are arranged in rows and columns, is one of the most typical display devices. The liquid crystal display panel is a typical matrix display panel. In general, a matrix type display panel is provided with a set of scan lines used for selecting rows of pixels, and a set of data lines fed with data signals having signal levels in accordance with grayscale levels of pixels. Pixels are arranged at respective intersections of the scan lines and data lines.

In general, the inversion drive technique, in which polarities of data signals are inverted at a predetermined time cycle, is used for driving a liquid crystal display panel for avoiding deterioration of liquid crystal material within pixels. In other words, pixels within a liquid crystal display panel are generally driven with alternate-current data signals. Typically, polarities of data signals fed to adjacent pixels are opposite to each other with respect to both of the row direction (the scan line direction) and the column direction (the data line direction). Such inversion drive technique is often called dot inversion drive technique.

International publication brochure No. WO96/16347 discloses a liquid crystal display device adapted to the inversion drive technique. This liquid crystal display device includes a pair of buffers for each display output terminal, one of which outputs a positive data signal and the other outputs a negated data signal. A pair of switches are prepared between the respective buffers and the display output terminal, and the switches are selectively operated to achieve the inversion drive techniques. The drive circuit architecture of the disclosed liquid crystal display device is adapted to not only the dot inversion drive, but also the line inversion drive.

Japanese Laid-Open Patent Application No. Jp-A Heisei 10-62744 discloses another technique for driving a liquid crystal display panel with the dot inversion drive technique. FIG. 1 is a circuit diagram of a drive circuit within a liquid crystal display device, which is dedicated to the dot inversion drive. The drive circuit shown in FIG. 1 drives a pair of data lines with a positive buffer 121 and a negative buffer 122. The positive buffer 121 outputs a data signal with the positive polarity with respect to the standard voltage level, while the negative buffer 122 outputs a data signal with the negative polarity with respect to the standard voltage level. The positive buffer 121 is connected with an odd output terminal $S_{2n-1}$ through a straight switch 123 and connected with an even output terminal $S_{2n}$ through a cross switch 124. The negative buffer 122 is, on the other hand, connected with the even output terminal $S_{2n}$ through a straight switch 125 and connected with the odd output terminal $S_{2n-1}$ through a cross switch 126. Additionally, a neutralizing switch 127 is connected between the respective output terminals and a common line 128. In the following description, the switches 123 to 127 and the common line 128 may be referred to as output switch circuit.

The straight switches 123, 125, the cross switches 124, 126, and the neutralizing switch 127 are controlled in response to a polarity signal POL and a latch signal STB.

When the latch signal STB is set to the “L” level and the polarity signal POL is set to the “H” level, the straight switches 123 and 125 are turned on, and an odd data line connected with the odd output terminal $S_{2n-1}$ is driven by the positive buffer 121, while an even data line connected with the even output terminal $S_{2n}$ is driven by the negative buffer 122. When the latch signal STB and the polarity signal POL are both set to the “L” level, the cross switches 124 and 126 are turned on, and the odd data line is driven by the negative buffer 122 while the even data line is driven by the positive buffer 121. When the latch signal STB is set to the “H” level, the straight switches 123, 125, the cross switches 124, 126 are turned off, an the neutralizing switch 127 is turned on, regardless of the state of the polarity signal POL. As thus described, the voltage levels on the respective data lines are neutralized by the neutralizing switch 127 before inversing the polarities of the voltage levels on the respective data lines, to thereby reduce the power consumption necessary for driving the data lines.

The liquid crystal display devices disclosed in the above-mentioned documents are both designed to achieve the inversion drive by selectively turning on the switches provided between the buffers and the display output terminals; however, such configuration suffers from a problem of large heat generation at the switches between the buffers and the display output terminals. In the drive circuit shown in FIG. 1, for example, large currents are flown through the switches 123 to 127 to drive the data lines, and therefore the heat generation is increased as the increase in the on-resistance of the switches 123 to 127. Also, the heat generation at the switches 123 to 127 is undesirably increased, when the capacitance of the data lines is increased to achieve a larger size and a fine resolution of the liquid crystal display panel. The increased heat generation undesirably reduces the lifetime of the data line drive circuit.

One approach for avoiding this problem may be using large-sized transistors as the switches 123 to 127, which effectively reduces the on-resistance of the switches 123 to 127; however, this approach undesirably increases the circuit size.

SUMMARY OF THE INVENTION

In an aspect of the present invention, a display panel drive circuit for outputting data signals on display output terminals connected with data lines of a display panel is provided with a first output section directly connected with a first display output terminal and a second output section directly connected with the first display output terminal. The first output section is configured to output a data signal with the positive polarity with respect to a predetermined standard voltage level, while the second output section is configured to output a data signal with the negative polarity with respect to the standard voltage level. The first and second output sections are controlled so that one of the first and second output sections is activated, while the other is deactivated.

Such architecture eliminates the need for providing a switch between an amplifier outputting a data signal to a data line and a display output terminal connected with the data line. Therefore, the display panel drive circuit according to the present invention avoids the problem of heat generation at the switch through which a drive current is flown, and effectively reduces the heat generation of the drive circuit.

BRIEF DESCRIPTION OF THE DRAWINGS

The above and other advantages and features of the present invention will be more apparent from the following description taken in conjunction with the accompanied drawings, in which:

FIG. 15A is a circuit diagram illustrating the structure of the output stages of the drive circuit in a second embodiment;

FIG. 15B is a table illustrating the operation of the output stages of in the second embodiment;

FIG. 15C is another circuit diagram illustrating the structure of the output stages of the drive circuit in the second embodiment;

FIG. 16A is a circuit diagram illustrating another structure of the output stages of the drive circuit in the second embodiment;

FIG. 16B is a table illustrating the operation of the output stages shown in FIG. 16A in the second embodiment; and FIG. 16C is another circuit diagram illustrating the structure of the output stages shown in FIG. 16A in the second embodiment.

DESCRIPTION OF THE PREFERRED EMBODIMENTS

Figure 1:
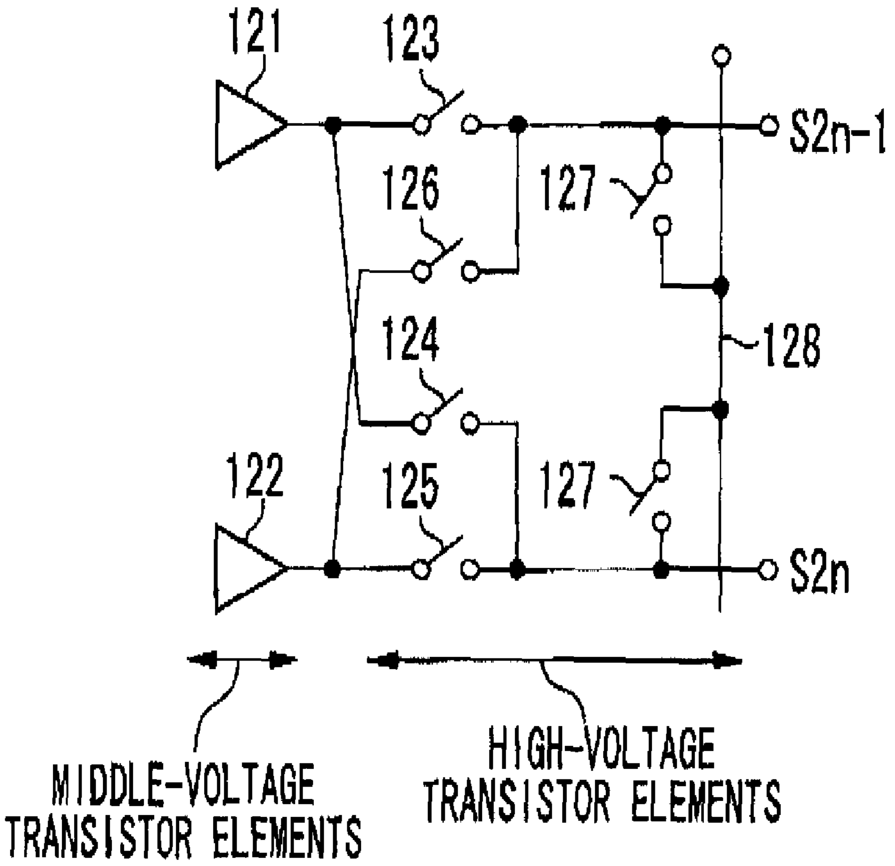
Fig. 1 PRIOR ART
FIG. 1 is a circuit diagram illustrating a conventional drive circuit for achieving the dot inversion drive.

The invention will be now described herein with reference to illustrative embodiments. Those skilled in the art would recognize that many alternative embodiments can be accomplished using the teachings of the present invention and that the invention is not limited to the embodiments illustrated for explanatory purposed. It should be noted that the same, similar, or corresponding elements are denoted by the same or similar numerals in the drawings.

First Embodiment

Figure 2:
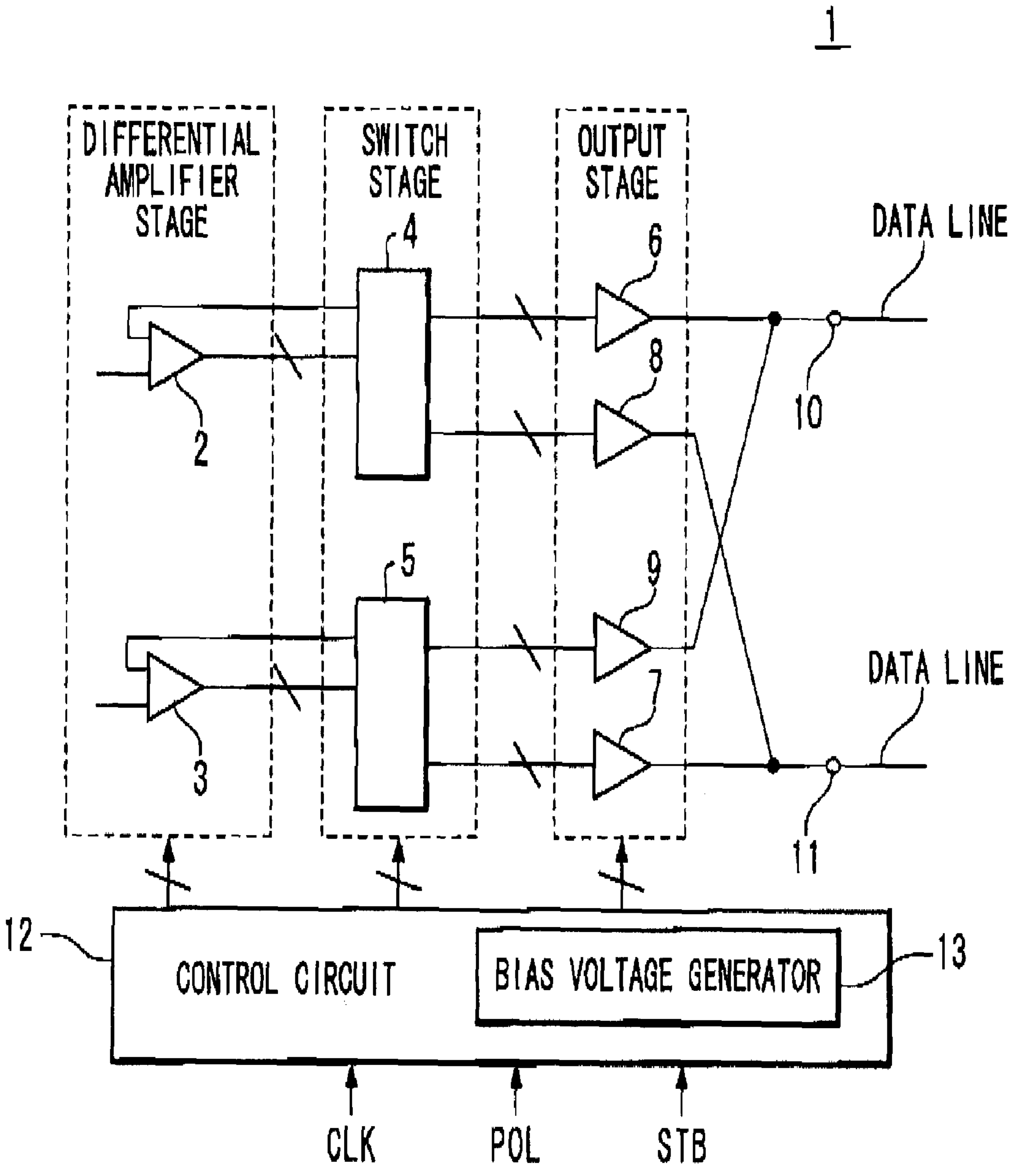
FIG. 2 is a block diagram illustrating a preferred structure of a drive circuit in a first embodiment of the present invention.

FIG. 2 is a block diagram illustrating the structure of a drive circuit 1 within a driver IC in a first embodiment of the present invention. In this embodiment, the drive circuit 1 is controlled in response to a polarity signal POL to output a positive or negative data signal onto a first display output terminal and to output a negative or positive data signal onto a second display output terminal, so that a liquid crystal display panel is driven by a dot inversion drive technique. In other words, the drive circuit 1 is designed to feed data signals with opposite polarities to adjacent data lines, to invert the polarities of the data signals between adjacent scan lines, and to invert drive voltages fed to respective pixels (referred to as pixel voltages, hereinafter) between adjacent frame periods. It should be noted that the polarity of a data signal is defined with respect to a standard voltage level. In this embodiment, the standard voltage level is set to the IC ground level which is the circuit ground level of the driver IC. Instead, the standard voltage level may be set to the voltage level on the common electrode of the liquid crystal display panel. It should be noted that the IC ground level may be different from the system ground level, which is the circuit ground level of the display device system.

In one embodiment, the drive circuit 1 includes differential amplifier stages 2, 3, switch stages 4, 5, output stages 6, 7, 8, 9, display output terminals 10, 11, and a control circuit 12 controlling these stages. The differential amplifier stages 2 and 3 each receive a grayscale voltage from a grayscale voltage selector on the first input. Each grayscale voltage has a voltage level in accordance with display data. In one embodiment, the grayscale voltages are generated by a D/A converter through D/A conversion of the display data.

The switch stage 4 has a function of selectively connecting the output of the differential amplifier stage 2 with one of the output stages 6 and 8, while the switch stage 5 has a function of selective connecting the output of the differential amplifier stage 3 with one of the output stages 7 and 9. The switch stage 4 additionally has a function of connecting one of the display output terminals 10 and 11 with the second input of the differential amplifier stage 2. Correspondingly, the switch stage 5 additionally has a function of connecting one of the display output terminals 10 and 11 with the second input of the differential amplifier stage 3.

It should be noted that four output stages are prepared for two display output terminals. The output stage 6 and 8 are designed to output a positive data signal, while the output stage 7 and 9 are designed to output a negative data signal. The outputs of the output stages 6 and 9 are connected with the display output terminal 10, and the outputs of the output stages 7 and 8 are connected with the display output terminal 11. The output stages 6 and 8 are designed to exhibit high drive capacity in the pull-up of the data signals, while the output stages 7 and 9 are designed to exhibit high drive capacity in the pull-down of the data signals.

The differential amplifier stages 2 and 3 are composed of middle-voltage transistor elements, and the output stages 6 to 9 are composed of high-voltage transistor elements. The switch stages 4 and 5 are composed of middle-voltage transistor elements and high-voltage transistor elements. A detailed description will be given later of the middle-voltage transistor elements and the high-voltage transistor elements.

The control circuit 12 receives external control signals including a clock signal CLK, a latch signal STB, and a polarity signal POL, and generates internal control signals used for the control of the respective stages within the drive circuit 1. Additionally, the control circuit 12 includes a bias voltage generator 13 that feeds bias voltages to constant current sources within the differential amplifier stages 2, 3 and the output stages 6 to 9.

A description is given of operation voltages of the respective stages within the drive circuit 1. The differential amplifier stage 2, the switch stage 4, and the output stage 6 are operated in the voltage range from a voltage VPL to a voltage VPH, while the differential amplifier stage 3, the switch stage 5, and the output stage 7 are operated in the voltage range from a voltage VNL to a voltage VNH. In one embodiment, the voltage VPH is set to 10 V, and the voltages VPL and VNH are set to 0 V (the ground level), while the voltage VNL is set to −10 V. The voltages VPL and VNH may be different under the conditions described below:

VPH>VPL>VNL, and

VPH>VNH>VNL.

The voltage VPL may be larger or smaller than the voltage VNH. In the following description, it is assumed that the IC ground level (the circuit ground level of the drive circuit 1) is identical to the system ground level (the circuit ground level of the display device system), but not identical to the voltage level of the common electrode, and that the voltages VPL and VNH are both set to 0 V.

Figure 3:
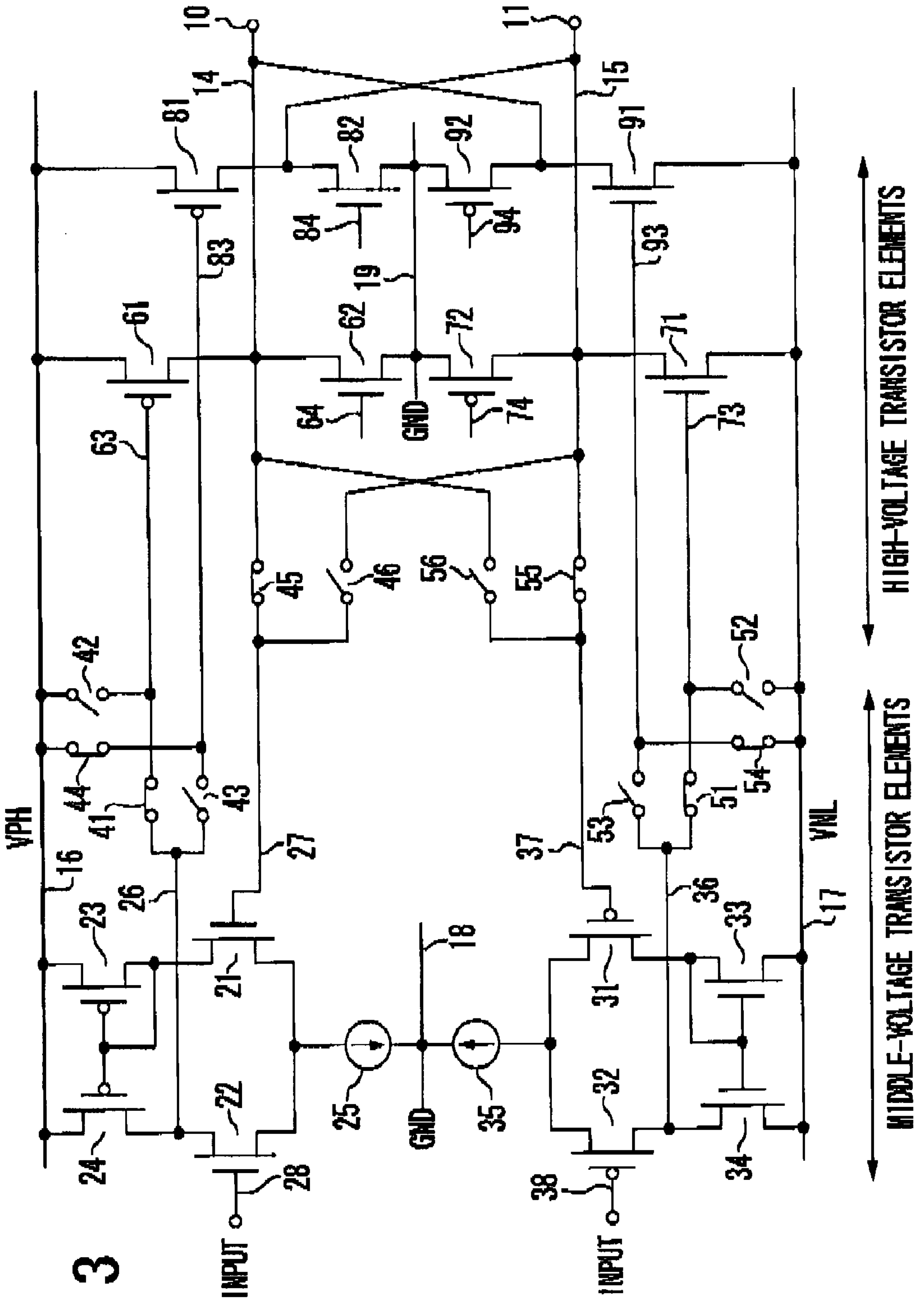
FIG. 3 is a circuit diagram illustrating the structure of the drive circuit in the first embodiment.

FIG. 3 is a detailed circuit diagram of the drive circuit 1. The differential amplifier stage 2 is provided with transistors 21 to 24 and a constant current source 25, and the differential amplifier stage 3 is provided with transistors 31 to 34 and a constant current source 35. Middle-voltage transistor elements are used as the transistors within the differential amplifier stages 2 and 3. The switch stage 4 is provided with switches 41 to 46 and the switch stage 5 is provided with switches 51 to 56. High-voltage transistor elements are used as the switches 45, 46, 55 and 56, while middle-voltage transistor elements are used as other switches within the switch stages 4 and 5. The output stage 6 is provided with transistors 61 and 62 and the output stage 7 is provided with transistors 71 and 72. Correspondingly, the output stage 8 is provided with transistors 81 and 82, and the output stage 9 is provided with transistors 91 and 92. High-voltage transistor elements are used as the transistors within the output stages 6 to 9.

The respective switches within the switch stages 4 and 6 are controlled in response to control signals received from the control circuit 12. Additionally, the gate voltages of the transistors 62, 72, 82, and 92 within the output stages 6 to 9 are controlled by the control circuit 12.

One feature of the driver circuit 1 in this embodiment is that each display output terminal is directly connected with two output stages: one designed to output a positive data signal, and the other designed to output a negative data signal, and that these two output stages are exclusively activated. Specifically, the display output terminal 10 is connected with the output stage 6, which is designed to output a positive data signal, and with the output stage 9, which is designed to output a negative data signal. The control circuit 12 controls the output stages 6 and 9 so that only one of the output stages 6 and 9 is activated. Correspondingly, the display output terminal 11 is connected with the output stage 7, which is designed to output a negative data signal, and with the output stage 8, which is designed to output a positive data signal. The control circuit 12 controls the output stages 7 and 8 so that only one of the output stages 7 and 8 is activated.

Such drive circuit architecture eliminates the need for providing switches between the display output terminals 10, 11 and the output stages 6 to 9, and fundamentally solves the problem of the heat generation of the switches.

Figure 4:
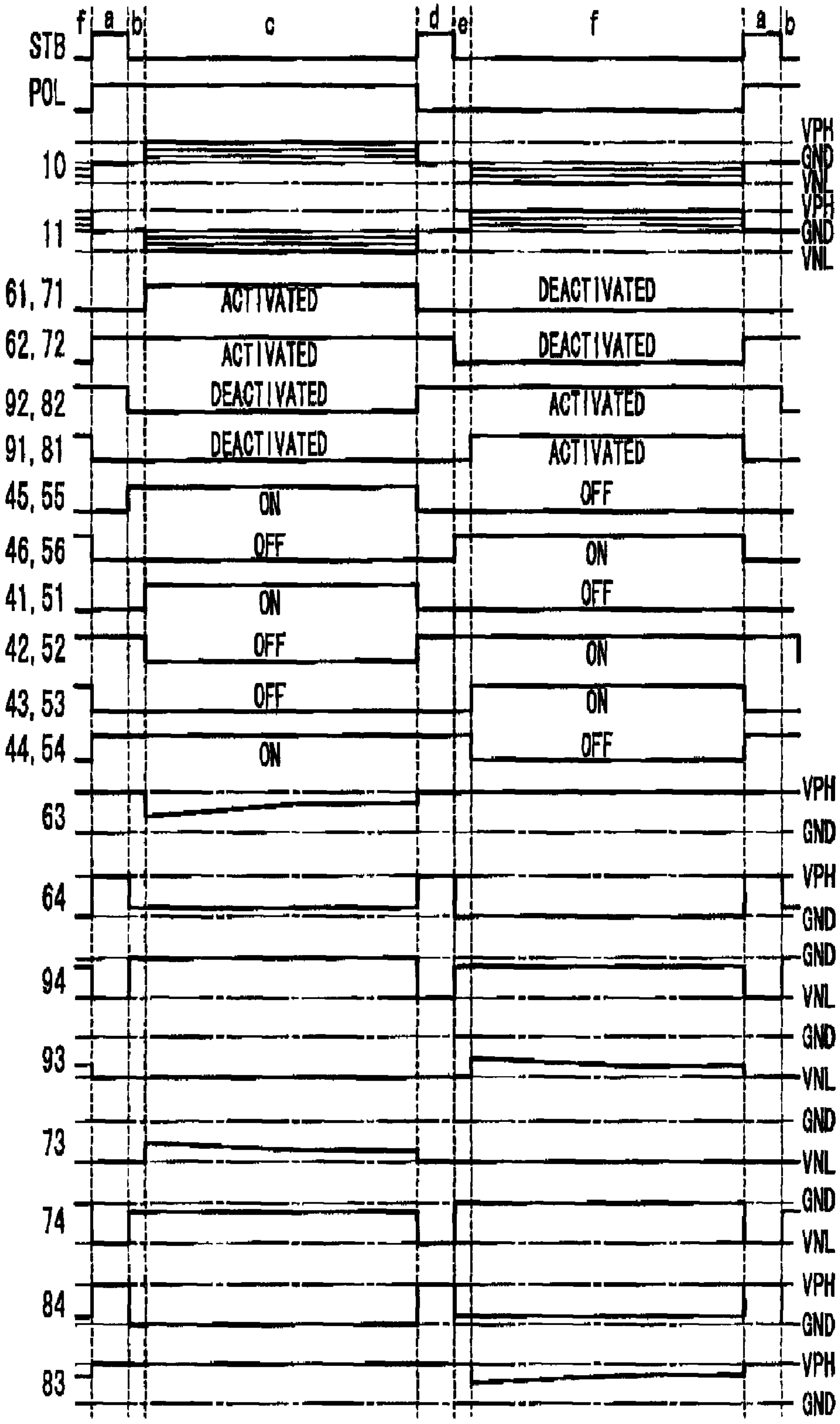
FIG. 4 is a timing chart illustrating the operation of the drive circuit in the first embodiment.

In the following, a detailed description is given of the operation of the drive circuit 1 with reference to the timing chart shown in FIG. 4. In an initial state (initial Period f), the output stages 6 and 7 are deactivated, and the output stages 8 and 9 are activated. The output stage 9 outputs a negative data signal to the display output terminal 10, and the output stage 8 outputs a positive data signal to the display output terminal 11.

More specifically, the states of the respective transistors and switches within the Period f are as follows: the switch 41 is turned off and the switch 42 is turned on, so that the gate electrode node 63 of the transistor 61 is set to the voltage VPH to turn oft the transistor 61. The gate electrode node 64 of the transistor 62, which has a voltage level controlled by the bias voltage generator 13, is set to the ground level to turn off the transistor 62. Therefore, the output stage 6 is placed into the high-impedance state (the deactivated state).

On the other hand, the switch 51 is turned off and the switch 52 is turned on, so that the gate electrode node 73 of the transistor 71 is set to the voltage VNL to turn off the transistor 71. A gate electrode node 74 of the transistor 72, which has a voltage level controlled by the bias voltage generator 13, is set to the ground level to turn off the transistor 72. Therefore, the output stage 7 is also placed into the deactivated state.

On the other hand, the switch 54 is turned off and the switch 53 is turned on, so that the gate electrode node 93 of the transistor 91 is electrically connected with a node 36 within the differential amplifier stage 3 through the switch 53. Additionally, the switch 44 is turned off and the switch 43 is turned on, so that the gate electrode node 83 of the transistor 81 is connected with a node 26 within the differential amplifier stage 2. Furthermore, the gate electrode node 94 of the transistor 92 receives a bias voltage B4 from the bias voltage generator 13, and therefore the transistor 92 operates as a constant current source.

On the other hand, the gate electrode node 84 of the transistor 82 receives a bias voltage B3 from the bias voltage generator 13, and therefore the transistor 82 operates as a constant current source. Additionally, the switch 55 is turned off and the switch 56 is turned on, so that the display output terminal 10 is electrically connected through the switch 56 with the gate electrode node 37 of the transistor 31 within the differential amplifier stage 3. Finally, the switch 45 is turned off and the switch 46 is turned on, so that the display output terminal 11 is electrically connected through the switch 46 with the gate electrode node 27 of the transistor 21 within the differential amplifier stage 2.

Therefore, the Period f is a period within which the output stages 6 and 7 are deactivated, and the output stage 9 outputs a positive data signal and the output stage 8 outputs a negative data signal. It should be noted that the control of the gate voltages of the transistors 62, 72, 82, and 92 will be described in detail later.

A description is next given of a Period a. During the Period a, the polarity signal POL is set to the "H" level and the latch signal STB is also set to the "H" level. In response to the pull-up of the latch signal STB to the "H" level, display data are latched by a data latch circuit (not shown) and subjected to D/A conversion. This results in that a positive grayscale signal generated by the D/A conversion is fed to a node 28 within the differential amplifier stage 2, and that a negative grayscale signal generated by the D/A conversion is fed to a node 38 within the differential amplifier stage 3. Additionally, the respective data lines are precharged to the ground level or a level near the ground level. The voltage level to which the respective data lines are precharged may be in a range from −0.5 V to +0.5 V.

It should be noted that, in the following, descriptions are given of only transistors whose states are changed, and descriptions are omitted regarding transistors whose states are unchanged.

Within the Period a, the switch 53 is turned off and the switch 54 is turned on, so that the gate electrode node 93 of the transistor 91, which is connected with the display output terminal 10, is electrically disconnected from the node 36 within the differential amplifier stage 3 and electrically connected with a VNL power source 17. This results in that the voltage level of the gate electrode node 93 is set to the voltage VPL, and the transistor 91 is turned off. Correspondingly, the switch 43 is turned off and the switch 44 is turned on, so that the gate electrode node 83 of the transistor 81, which is connected with the display output terminal 11, is electrically disconnected from the node 26 within the differential amplifier stage 2 and electrically connected with a VNL power source 16. This results in that the voltage level of the gate electrode node 83 is set to the voltage VPH, and the transistor 81 is turned off.

Descriptions are next given of transistors which are turned on within the Period a. The gate electrode node 64 of the transistor 62, which is connected with the display output terminal 10, receives the voltage VPH from the bias voltage generator 13, and therefore the transistor 62 is turned on. Additionally, the gate electrode node 94 of the transistor 92 receives the voltage VNL from the bias voltage generator 13, and therefore the transistor 92 is turned on. Furthermore, the gate electrode node 84 of the transistor 82, which is connected with the display output terminal 11, receives the voltage VPH from the bias voltage generator 13, and therefore the transistor 82 is turned on. Finally, the gate electrode node 74 of the transistor 72 receives the voltage VNL from the bias voltage generator 13, and therefore the transistor 72 is turned on. Accordingly, the transistors 62, 72, 82 and 92 are turned on within the Period a, and the transistors 61, 71, 81 and 91 are turned off within the Period a. In other words, the transistors connected with the circuit ground are activated to drive the respective data lines to the ground level.

A description is next given of a Period b. The Period b is defined as a period of several clock cycles after the latch signal STB is switched from the "H" level to the "L" level with the polarity signal POL set to the "H" level. Within the Period b, the gate electrode node 94 of the transistor 92, which is connected with the display output terminal 10, is set to the ground level, and therefore the transistor 92 is turned off. Additionally, the gate electrode node 64 of the transistor 62 receives a bias voltage B1, and the transistor 62 operates as a constant current source.

Correspondingly, the gate electrode node 84 of the transistor 82, which is connected with the display output terminal 11, is set to the ground level, and therefore the transistor 82 is turned off. Additionally, the gate electrode node 74 of the transistor 72 receives a bias voltage B2, and the transistor 72 operates as a constant current source.

Furthermore, the switch 45 is turned on to provide an electrical connection between the node 27 within the differential amplifier stage 2 and the display output terminal 10 through the switch 45. Additionally, the switch 55 is turned on to provide an electrical connection between the node 37 within the differential amplifier stage 3 and the display output terminal 10 through the switch 55. The turn-on of the switches 45 and 55 within the Period b effectively avoids the transistor 21 being applied with a voltage out of the allowed operation voltage range from the ground level to the voltage VPH, and also avoids the transistor 31 being applied with a voltage out of the allowed operation voltage range from the voltage VNL to the ground level, since the respective data lines are already precharged to the ground level within the Period a. This effectively prevents the transistors 21 and 31, which are middle-voltage transistor elements, from being destroyed by application of voltages exceeding the withstand voltages to the transistors 21 and 31.

A description is next given of a Period c. During the Period c, the polarity signal POL is set to the "H" level and the latch signal STB is set to the "L" level, so that a positive data signal is outputted from the display output terminal 10 and a negative data signal is outputted from the display output terminal 11. More specifically, within the Period c, a positive data signal is outputted from the output stage 6 to the display output terminal 10, and a negative data signal is outputted from the output stage 7 to the display output terminal 11. The output stages 8 and 9 are both deactivated within the Period c.

Within the Period c, the transistors 61 and 71 are activated. The activation of the transistors 61 and 71 is achieved by the turn-on of the switches 41 and 51 and the turn-off of the switches 42 and 52, This results in that the node 26 within the differential amplifier stage 2 is electrically connected with the gate electrode node 63 of the transistor 61 through the switch 41. In other words, the differential amplifier stage 2 and the output stage 6 operate as a voltage follower outputting a positive data signal. Additionally, the node 36 within the differential amplifier stage 3 is electrically connected with the gate electrode node 73 of the transistor 71 through the switch 51, and therefore the differential amplifier stage 3 and the output stage 7 operate as a voltage follower outputting a negative data signal.

Figure 5:
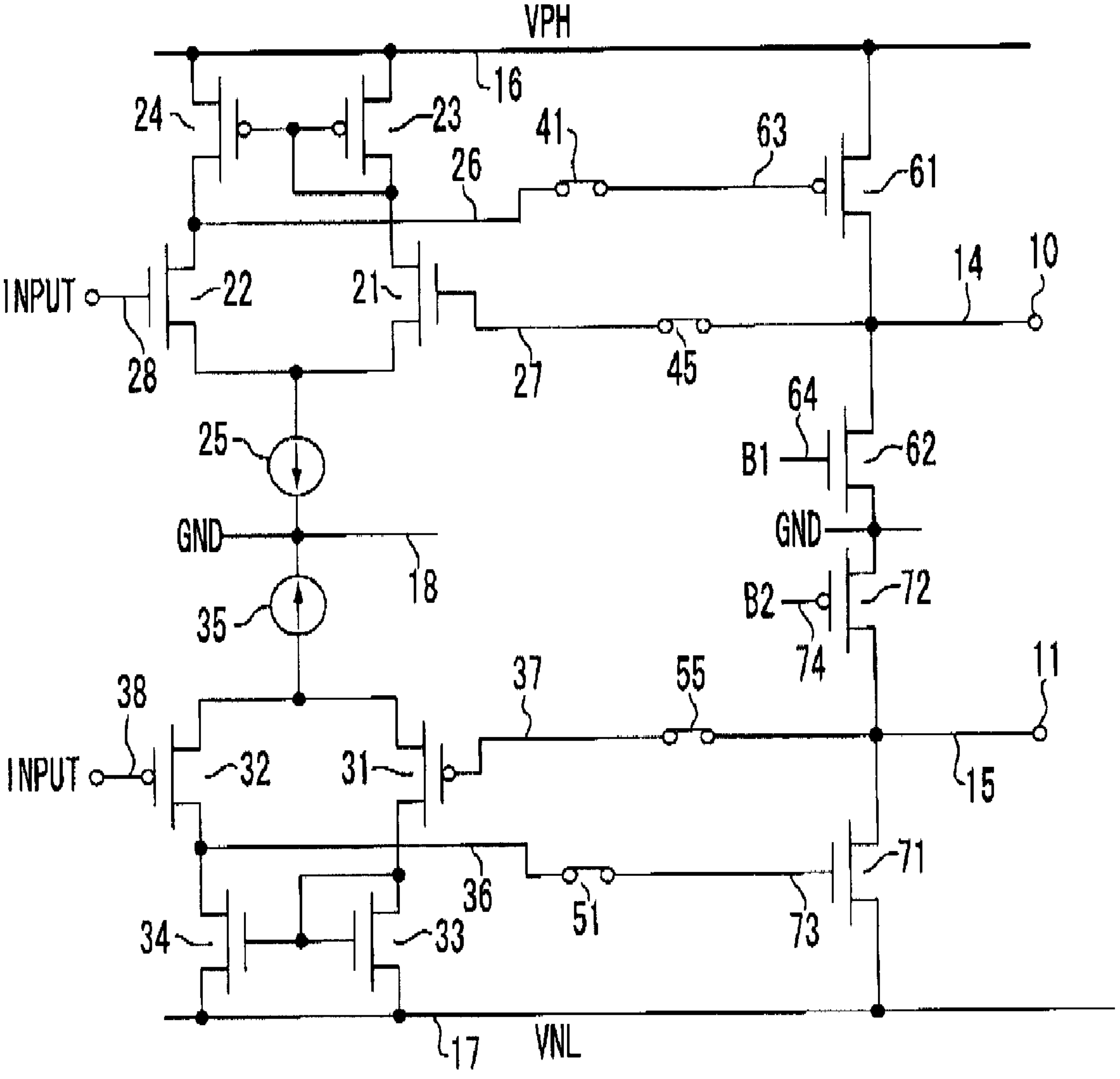
FIG. 5 is an equivalent circuit diagram of the drive circuit during a Period c in the first embodiment.

FIG. 5 is an equivalent circuit diagram of the drive circuit 1 within the Period c. This equivalent circuit diagram is obtained by removing the off-state transistors and the switches within the switch stages 4 and 5 that control the off-state transistors from the circuit diagram shown in FIG. 3, for the simplicity of the figure. With respect to the states of the respective switches that controls the transistor 81, for example, the switch 43 is turned off, and the switch 44 is turned on, so that the gate electrode node 83 of the transistor 81 is set to the voltage VPH to turn off the transistor 81. Additionally, the gate electrode of the transistor 82 receives a bias voltage of the ground level from the bias voltage generator 13, and therefore the transistor 82 is turned off to place the output stage 8 into the high impedance state. In the same way, the output stage 9 is also placed into the high impedance state. The equivalent circuit diagram shown in FIG. 5 is obtained by removing the output stages 8 and 9 and the switches controlling the output stages 8 and 9 from the circuit diagram shown in FIG. 3.

A description is next given of a Period d. During the Period d, the polarity signal POL is set to the "L" level and the latch signal STB is set to the "H" level. In response to the pull-up of the latch signal STB to the "H" level, display data are latched by the data latch circuit and subjected to D/A conversion. This results in that a positive grayscale signal generated through the D/A conversion is fed to a node 28 within the differential amplifier stage 2, and that a negative grayscale signal generated by the D/A conversion is fed to a node 38 within the differential amplifier stage 3. Additionally, the respective data lines are precharged to the ground level or a level near the ground level.

Within the Period d, the switch 41 is turned off and the switch 42 is turned on, so that the gate electrode node 63 of the transistor 61, which is connected with the display output terminal 10, is electrically disconnected from the node 26 within the differential amplifier stage 2, and is electrically connected with the VPH power source 16. This results in that the gate electrode node 63 of the transistor 61 is set to the voltage VPH to turn off the transistor 61. Additionally, the switch 51 is turned off and the switch 52 is turned on, so that the gate electrode node 73 of the transistor 71, which is connected with the display output terminal 11, is electrically disconnected from the node 36 within the differential amplifier stage 3, and is electrically connected with the VNL power source 17. This results in that the gate electrode node 73 of the transistor 71 is set to the voltage VNL to turn off the transistor 71.

Descriptions are next given of transistors which are turned on within the Period d. The gate electrode node 94 of the transistor 92, which is connected with the display output terminal 10, receives the voltage VNL from the bias voltage generator 13, and therefore the transistor 92 is turned on. Additionally, the gate electrode node 64 of the transistor 62 receives the voltage VPH from the bias voltage generator 13, and therefore the transistor 62 is turned on. Furthermore, the gate electrode node 74 of the transistor 72, which is connected with the display output terminal 11, receives the voltage VNL from the bias voltage generator 13, and therefore the transistor 72 is turned on. Finally, the gate electrode node 84 of the transistor 82 receives the voltage VPH from the bias voltage generator 13, and therefore the transistor 82 is turned on. Accordingly, the transistors 62, 72, 82 and 92 are turned on within the Period d, and the transistors 61, 71, 81 and 91 are turned off within the Period a. In other words, the transistors connected with the circuit ground are activated to drive the respective data lines to the ground level.

A description is given of a Period e. The Period e is defined as a period of several clock cycles after the latch signal STB is switched from the "H" level to the "L" level with the polarity signal POL set to the "L" level. Within the Period e, the gate electrode node 64 of the transistor 62, which is connected with the display output terminal 10, is set to the ground level, and therefore the transistor 62 is turned off. Additionally, the gate electrode node 94 of the transistor 92 receives a bias voltage B4, and the transistor 92 operates as a constant current source.

Correspondingly, the gate electrode node 74 of the transistor 72, which is connected with the display output terminal 11, is set to the ground level, and therefore the transistor 72 is turned off. Additionally, the gate electrode node 84 of the transistor 82 receives a bias voltage B3, and the transistor 82 operates as a constant current source.

Furthermore, the switch 46 is turned on to provide an electrical connection between the node 27 within the differential amplifier stage 2 and the display output terminal 11 through the switch 46. Additionally, the switch 56 is turned on to provide an electrical connection between the node 37 within the differential amplifier stage 3 and the display output terminal 10 through the switch 56. The turn-on of the switches 46 and 56 within the Period e effectively avoids the transistor 21 being applied with a voltage out of the allowed operation voltage range from the ground level to the voltage VPH, and also avoids the transistor 31 being applied with a voltage out of the allowed operation voltage range from the voltage VNL to the ground level, since the respective data lines are already precharged to the ground level within the Period d. This effectively prevents the transistors 21 and 31, which are middle-voltage transistor elements, from being destroyed by application of voltages exceeding the withstand voltages to the transistors 21 and 31.

Figure 6:
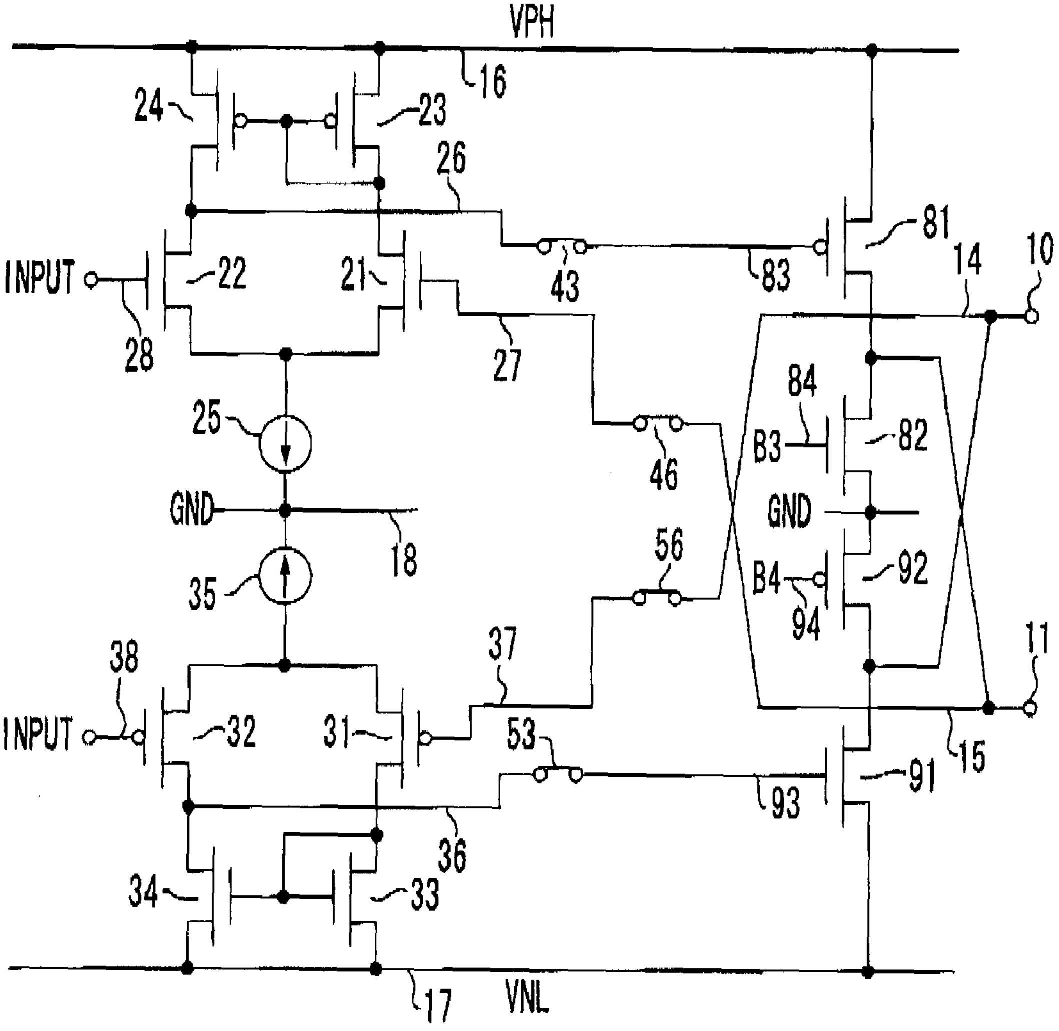
FIG. 6 is an equivalent circuit diagram of the drive circuit during a Period f in the first embodiment.

A description is next given of a Period f. FIG. 6 is an equivalent circuit diagram of the drive circuit 1 within the Period f. During the Period f, the polarity signal POL is set to the "L" level, and the latch signal STB is set to the "L" level, so that a negative data signal is outputted from the display output terminal 10, and a positive data signal is outputted from the display output terminal 11. In detail, the output stages 6 and 7 are deactivated, while the output stage 9 outputs a negative data signal to the display output terminal 10, and the output stage 8 outputs a positive data signal to the display output terminal 11.

Within the Period f, the transistors 81 and 81 are activated. The activation of the transistors 81 and 81 is achieved by the turn-on of the switches 43 and 53 and the turn-off of the switches 44 and 54. This results in that the node 26 within the differential amplifier stage 2 is electrically connected with the gate electrode node 83 of the transistor 81 through the switch 43. In other words, the differential amplifier stage 2 and the output stage 6 operate as a voltage follower outputting a positive data signal. Additionally, the node 36 within the differential amplifier stage 3 is electrically connected with the gate electrode node 93 of the transistor 91 through the switch 53, and therefore the differential amplifier stage 3 and the output stage 9 operate as a voltage follower outputting a negative data signal.

Figure 7:
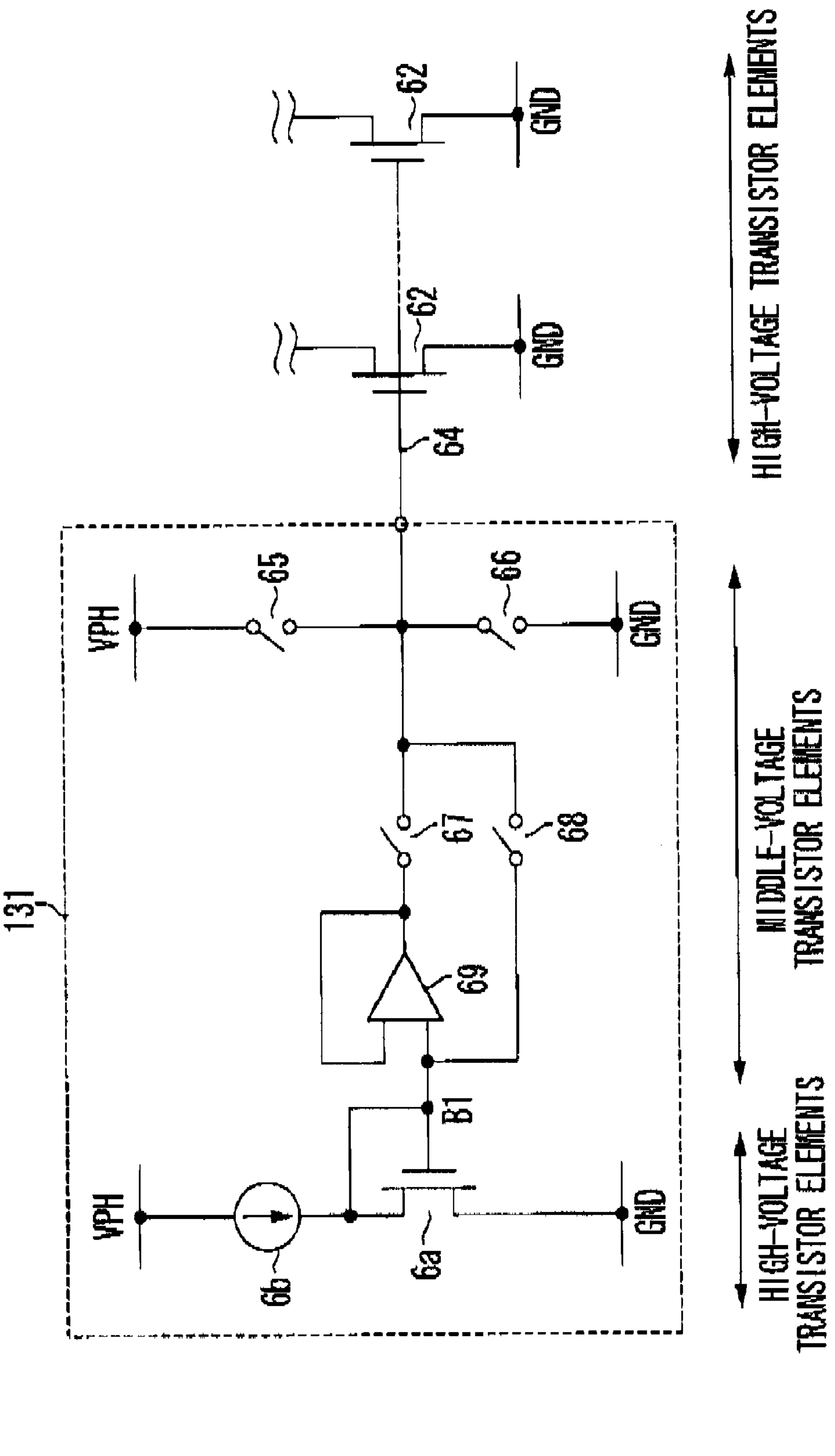
FIG. 7 is a circuit diagram illustrating the structure of a bias voltage generator in the first embodiment.
Figure 9:
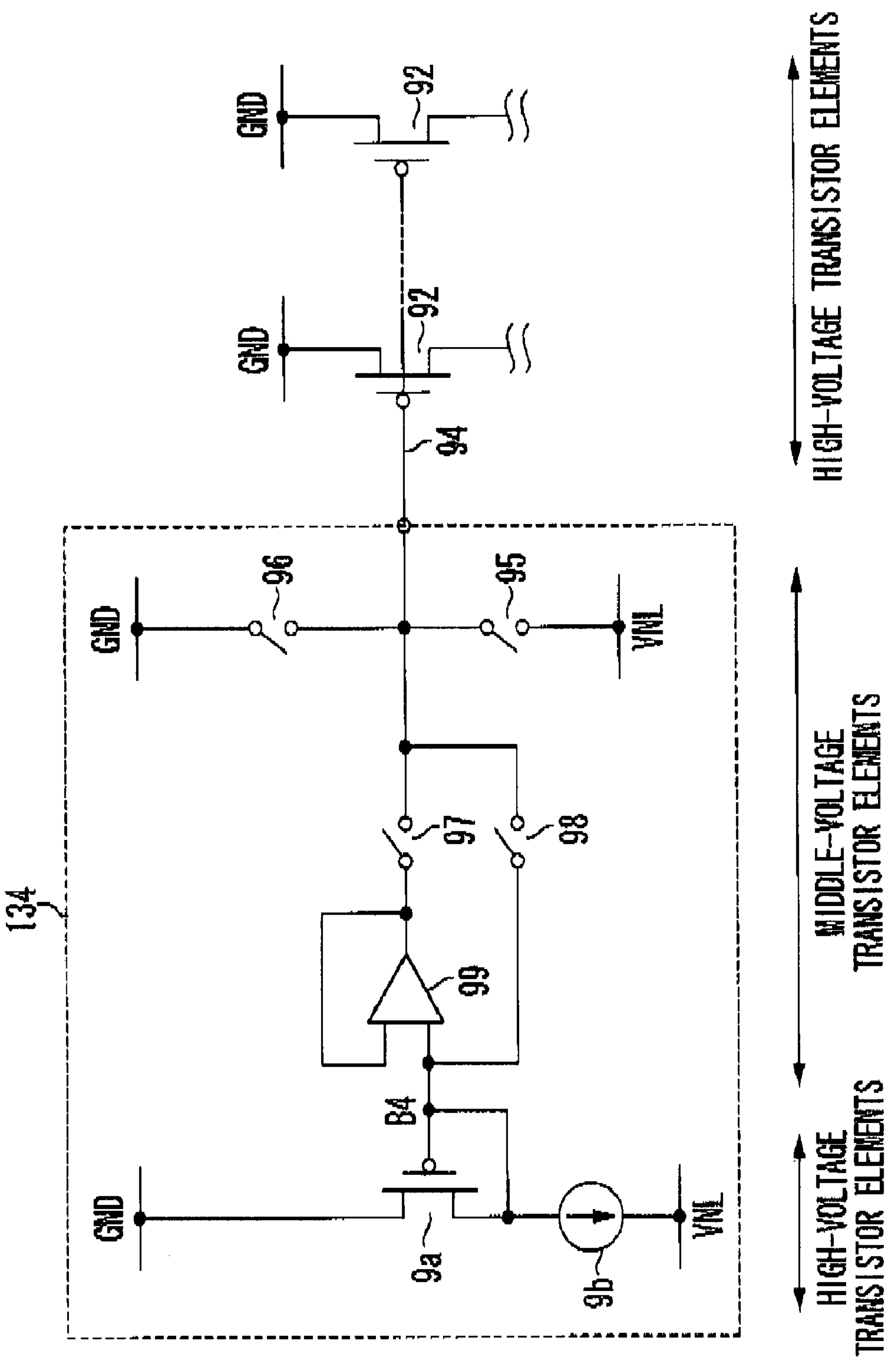
FIG. 9 is a circuit diagram illustrating the structure of another bias voltage generator in the first embodiment.

Referring to FIGS. 7 and 9, a description is next given of the structure of the bias voltage generator 13.

FIG. 7 shows a configuration of a bias voltage circuit 131 within the bias voltage generator 13, which feeds a voltage to the transistor 62. The gate electrode of the transistor 62 is fed with three different voltages: one is the bias voltage 81 for operating the transistor 62 as a constant current source, another is the voltage VPH for precharging the data lines to the ground level, and the other is the ground level voltage to turn off (or deactivate) the transistor 62. Therefore, a switch 66 is connected between the gate electrode node 64 of the transistor 62 and the circuit ground, and a switch 65 is connected between the gate electrode node 64 and the power source that feeds the voltage VPH, while the gate electrode node 64 of the transistor 62 is connected with a pair of switches 67 and 68 for feeding the bias voltage B1. A voltage follower 69 is operated when the gate electrode node 64 is driven from the voltage VPH to the bias voltage B1. This allows rapidly driving the gate electrode node 64 to the bias voltage B1. After the gate electrode node 64 is stabilized at the bias voltage B1, the switch 67 is turned off and the switch 68 is turned on, so that the bias voltage B1 is directly fed to the gate electrode node 64 without through the voltage follower 69. The voltage follower 69 is activated only during the Period b; the voltage follower 69 is deactivated during the other periods to reduce the power consumption. A high-voltage transistor element is preferably used as the transistor 6*a* connected with the constant current source 6*b*, since a high-voltage transistor element is used as the transistor 62, as described above. The bias voltage B3 fed to the transistor 82 is generated by a bias voltage circuit structured identically.

FIG. 9 shows a configuration of a bias voltage circuit 134 within the bias voltage generator 13, which feeds a voltage to the transistor 92. The gate electrode of the transistor 92 is fed with three different voltages: one is the bias voltage B4 for operating the transistor 92 as a constant current source, another is the voltage VNL for precharging the data lines to the ground level, and the other is the ground level voltage to turn off (or deactivate) the transistor 92. Therefore, a switch 96 is connected between the gate electrode node 94 of the transistor 92 and the circuit ground, and a switch 95 is connected between the gate electrode node 94 and the power source that feeds the voltage VNL, while the gate electrode node 94 of the transistor 92 is connected with a pair of switches 97 and 98 for feeding the bias voltage B4. A voltage follower 99 is operated when the gate electrode node 94 is driven from the voltage VNL to the bias voltage B4. This allows rapidly driving the gate electrode node 94 to the bias voltage B4. After the gate electrode node 94 is stabilized at the bias voltage B4, the switch 97 is turned off and the switch 98 is turned on, so that the bias voltage B4 is directly fed to the gate electrode node 94 without through the voltage follower 99. The voltage follower 99 is activated only during the Period e; the voltage follower 99 is deactivated during the other periods to reduce the power consumption. A high-voltage transistor element is preferably used as the transistor 9*a* connected with the constant current source 9*b*, since a high-voltage transistor element is used as the transistor 92, as described above. The bias voltage B2 fed to the transistor 72 is generated by a bias voltage circuit structured identically.

Figure 8:
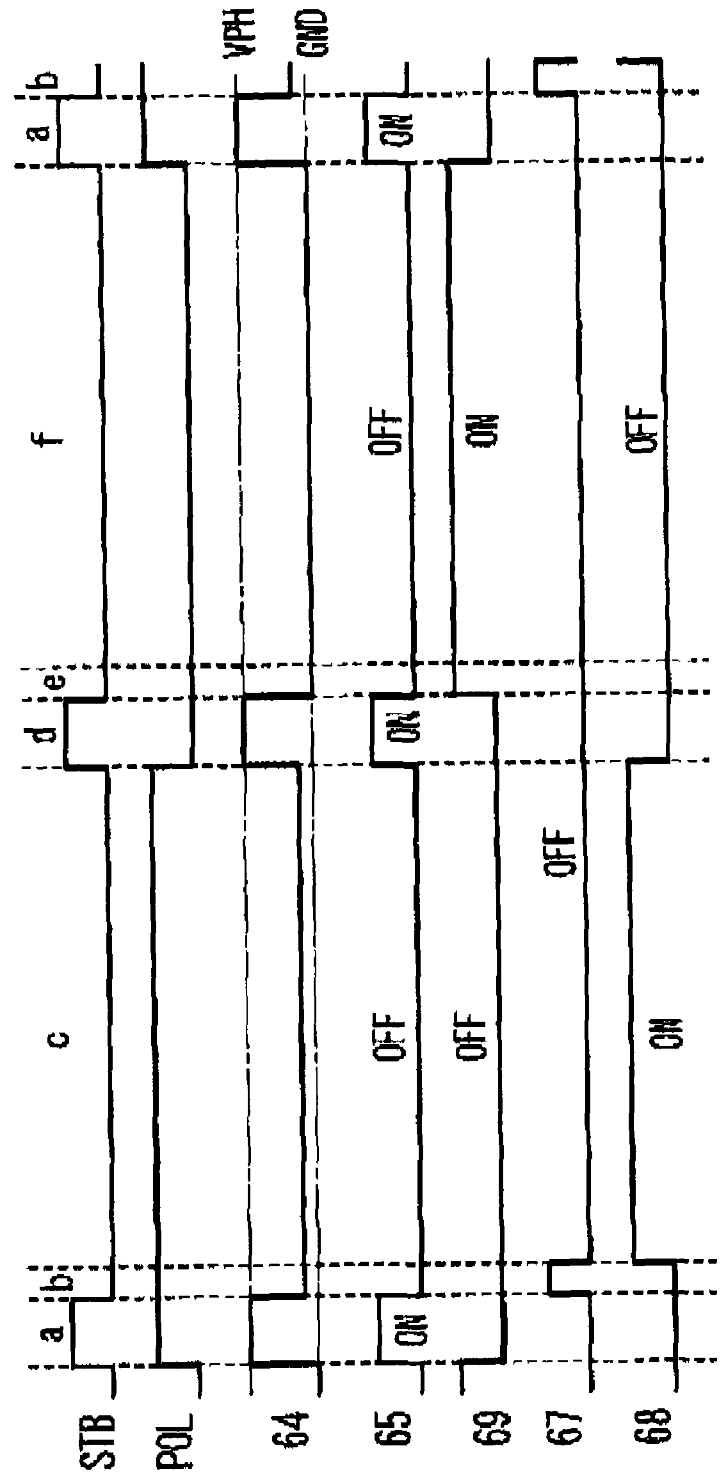
FIG. 8 is a timing chart illustrating the operation of the bias voltage generator shown in FIG. 7 in the first embodiment.
Figure 10:
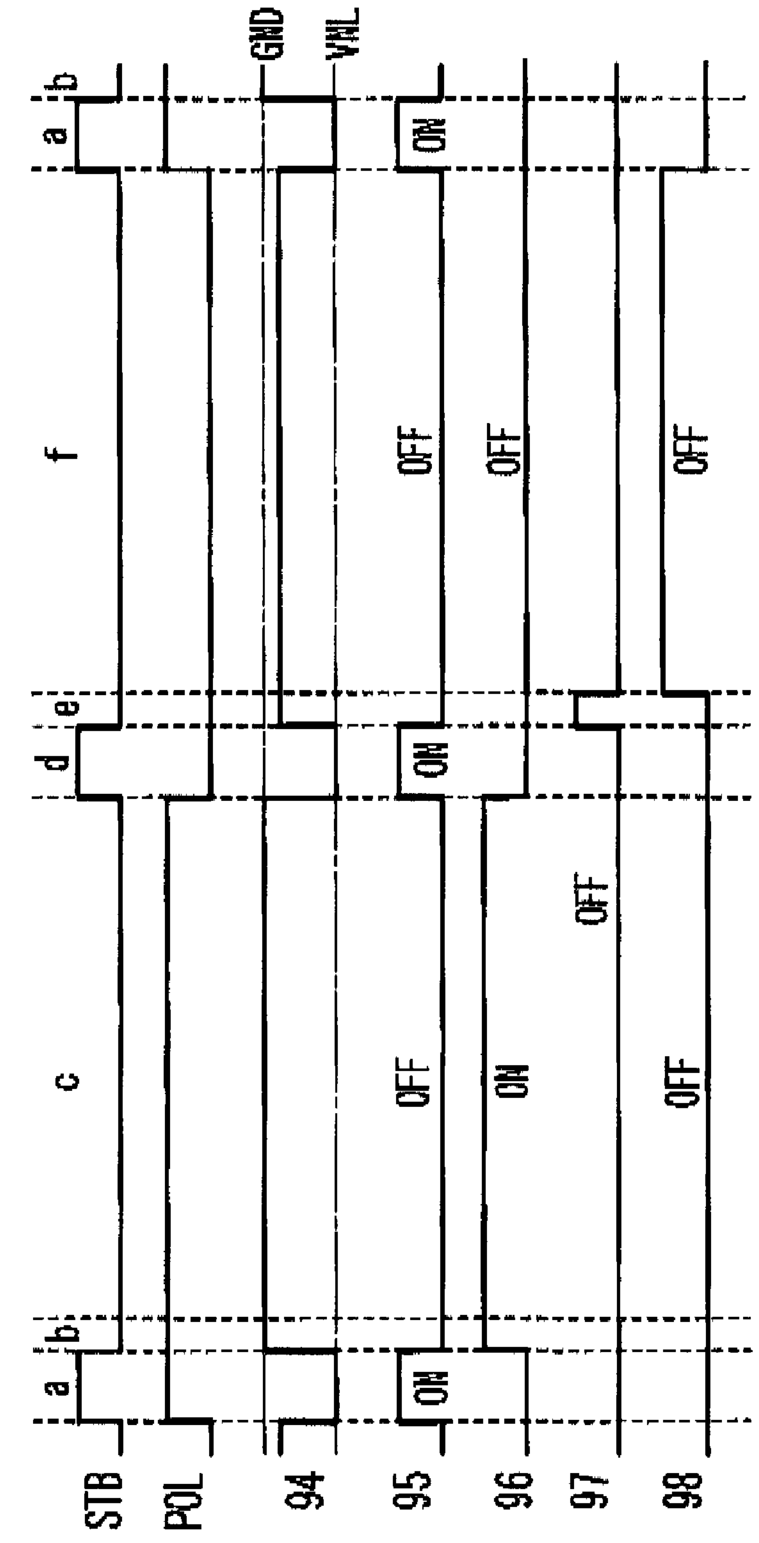
FIG. 10 is a timing chart illustrating the operation of the bias voltage generator shown in FIG. 9 in the first embodiment.

A description is next given of the bias voltage generator 13 with reference to timing charts shown in FIGS. 8 and 10. FIG. 8 is a timing chart illustrating the operation of the bias voltage circuit 131, which feeds a voltage to the transistor 62. During the Period a, the switch 65 is turned on and the switch 66 is turned off, so that the gate electrode node 64 is fed with the voltage VPH. During the Period b, the switch 65 is turned off and the switch 67 is turned on, so that the voltage follower 69 rapidly drives the gate electrode node 64 to the bias voltage B1. During the Period c, the switch 67 is turned off and the switch 68 is turned on, so that that the gate electrode node 64 is maintained at the bias voltage B1 without using the voltage follower 69. During the Period d, the switch 68 is turned off and the switch 65 is turned on, so that the gate electrode node 64 is fed with the voltage VPH. During the Period e, the switch 65 is turned off and the switch 66 is turned on, so that the gate electrode node 64 is set to the ground level. During the Period f, the state during the Period e is maintained; the gate electrode node 64 is kept set to the ground level. The operation timing of a bias voltage circuit 132 that feeds a voltage to the transistor 72 is identical to that of the bias voltage circuit 131.

FIG. 10 is a timing chart illustrating the operation of the bias voltage circuit 134, which feeds a voltage to the transistor 92. During the Period a, the switch 95 is turned on and the switch 96 is turned off, so that the gate electrode node 94 is fed with the voltage VNL. During the Period b, the switch 95 is turned off and the switch 97 is turned on, so that the gate electrode node 94 is set to the ground level. During the Period c, the state of the Period b is maintained. During the Period d, the switch 96 is turned off and the switch 95 is turned on, so that the gate electrode node 94 is fed with the voltage VNL. During the Period e, the switch 95 is turned off and the switch 97 is turned on, so that the voltage follower 99 rapidly drives the gate electrode node 94 to the bias voltage B4. During the Period f, the switch 97 is turned off and the switch 98 is turned on, so that the gate electrode node 94 is maintained at the bias voltage 84 without using the voltage follower 99. The operation timing of a bias voltage circuit 133 that feeds a voltage to the transistor 82 is identical to that of the bias voltage circuit 134.

It should be noted that grayscale signals are selected by the grayscale voltage selector (not shown) in accordance with the display data, and the selected grayscale signals are inputted to the input terminals 28 and 38 of the differential amplifier stages 2 and 3. The destinations of the display data are switched within a logic circuit, including the data latch circuit, and the display data are latched for a predetermined duration. The logic circuit, including the data latch circuit, is composed of low-voltage transistor elements. Additionally, a portion of the control circuit 12 is composed of low-voltage transistor elements. The grayscale voltage selector is composed of middle-voltage transistor elements.

Transistor elements within the respective circuit stages are designed so that the withstand voltage of middle-voltage transistor elements is higher than that of low-voltage transistor elements, and the withstand voltage of high-voltage transistor elements is higher than that of middle-voltage transistor elements. In one embodiment, the withstand voltage of low-voltage transistor elements is 3 V, and the withstand voltage of middle-voltage transistor elements is 12 V, while the withstand voltage of high-voltage transistor elements is 24 V. When the transistor elements are MOS transistors, the thicknesses Tox of gate dielectrics of the MOS transistors are adjusted so that the thickness of gate dielectrics of middle-voltage MOS transistors is thicker than that of gate dielectrics of low-voltage MOS transistors, and the thickness of gate dielectrics of high-voltage MOS transistors is thicker than that of gate dielectrics of the middle-voltage MOS transistors. Additionally, the gate length L of the MOS transistors are adjusted so that the gate length L of the middle-voltage MOS transistors is longer than that of the low-voltage MOS transistors, and the gate length L of the high-voltage MOS transistors is longer than that of the middle-voltage MOS transistors. Therefore, a circuit composed of high-voltage MOS transistors suffers from large circuit size. Accordingly, a circuit is preferably designed to exclude high-voltage MOS transistors as long as possible.

In one embodiment, the IC circuit ground, the voltage level of the common electrode, and the system ground are the same voltage level. This may necessitate an increase in the withstand voltage of middle-voltage MOS transistors. The pixel voltages suffer from offsets of 1 V to 2 V from the voltages originally fed from the drive circuits 1, due to the feed-through of TFTs within the pixels. Therefore, the voltage level of the positive data signal ranges from 2 V to 12 V, and the voltage level of the negative data signal ranges from −9 V to 2 V, when the offset caused by the TFT feed-through is 2 V to the maximum. This implies that the withstand voltage of middle-voltage MOS transistors is required to be 12 V or higher, since the withstand voltages of MOS transistors need to be higher than the operation voltage.

Figure 11:
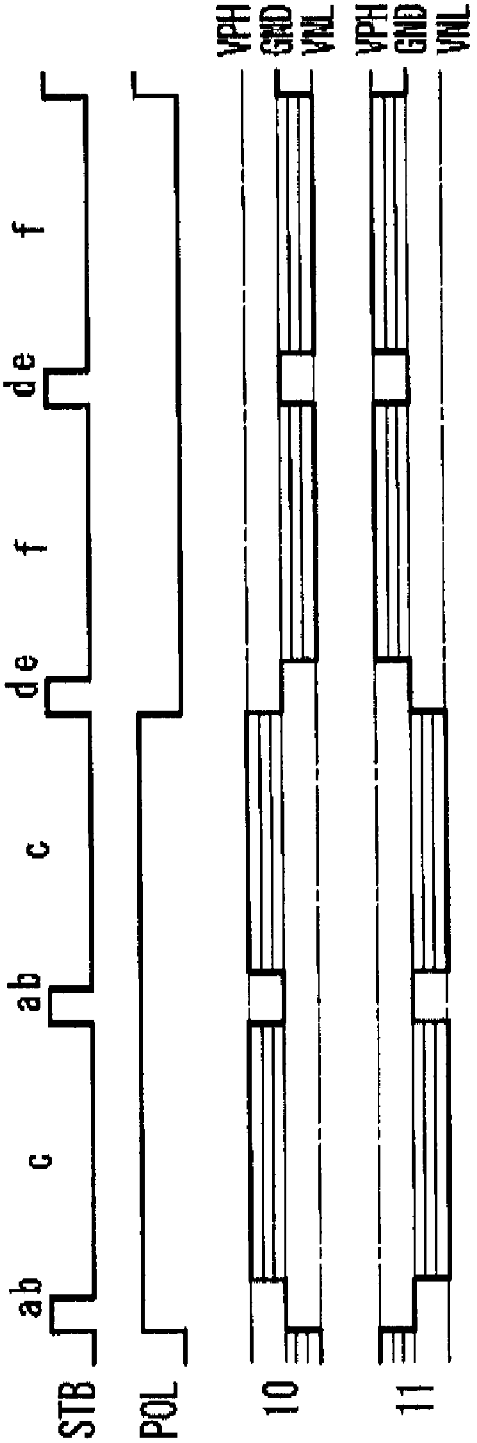
FIG. 11 is a timing chart illustrating another operation of the drive circuit in the first embodiment.

Heretofore, the description has been given of the dot inversion drive, in which data signals with opposite polarities are fed to adjacent data lines, and the polarities of the data signals are inverted between adjacent scan lines; however, the similar operation is applicable to a drive technique in which polarities of the data signals are inverted every two scan lines. In this case, as shown in FIG. 11, the data lines are precharged to the ground level during the Periods a, b, d and e.

Figure 12:
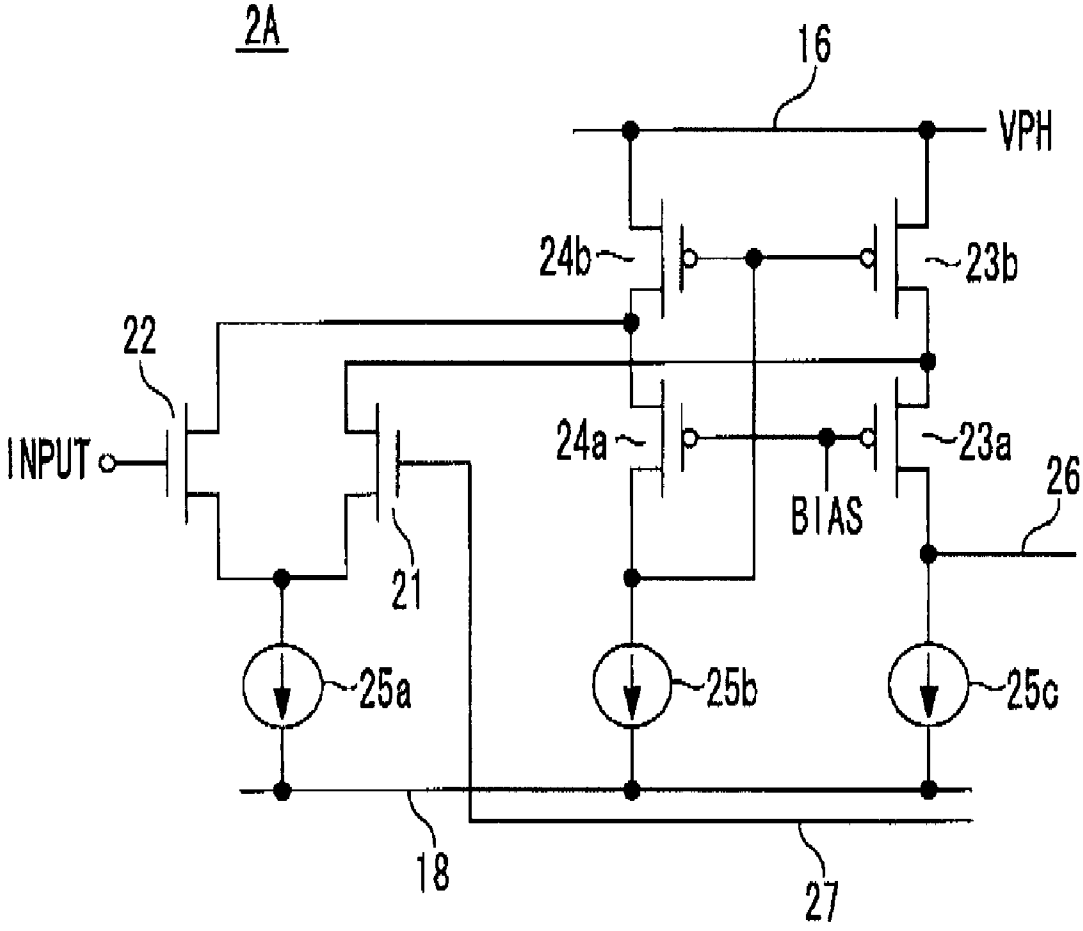
FIG. 12 is a circuit diagram illustrating another structure of the differential amplifier stages of the drive circuit in the first embodiment.

Although the differential amplifier stages are described as having the simplest circuit configuration in this embodiment for the simple explanation, the differential amplifier stages may be configured differently. For example, folded cascade amplifiers or other amplifier circuits may be used as the differential amplifier stages. FIG. 12 illustrates the structure of a differential amplifier stage 2A adopting the folded cascade differential amplifier architecture. The differential amplifier stage 2A is composed of transistors 21, 22, 23*a*, 23*b*, 24*a*, 24*b* and constant current sources 25*a*, 25*b*, and 25*c*.

Although the output stages 6 to 9 adopt an output circuit structure in which one transistor functions as a constant current source in the circuit structure shown in FIG. 3, the output stages 6 to 9 adopts the push-pull amplifier structure. With respect to the input-output characteristics of the differential amplifier stages 2 and 3, the input transistors 21, 22, 31 and 32 within the differential amplifier stages 2 and 3 preferably has a threshold voltage around 0 V (i.e. a threshold voltage of −0.1 V to 0.1 V), in order to enlarge the input/output ranges. As thus described, the transistors within the differential amplifier stages 2 and 3 may be appropriately selected out of enhancement-type transistors, depletion-type transistors, p-type transistors, or n-type transistors, in accordance with the power supply voltage and the output voltage.

Figure 13:
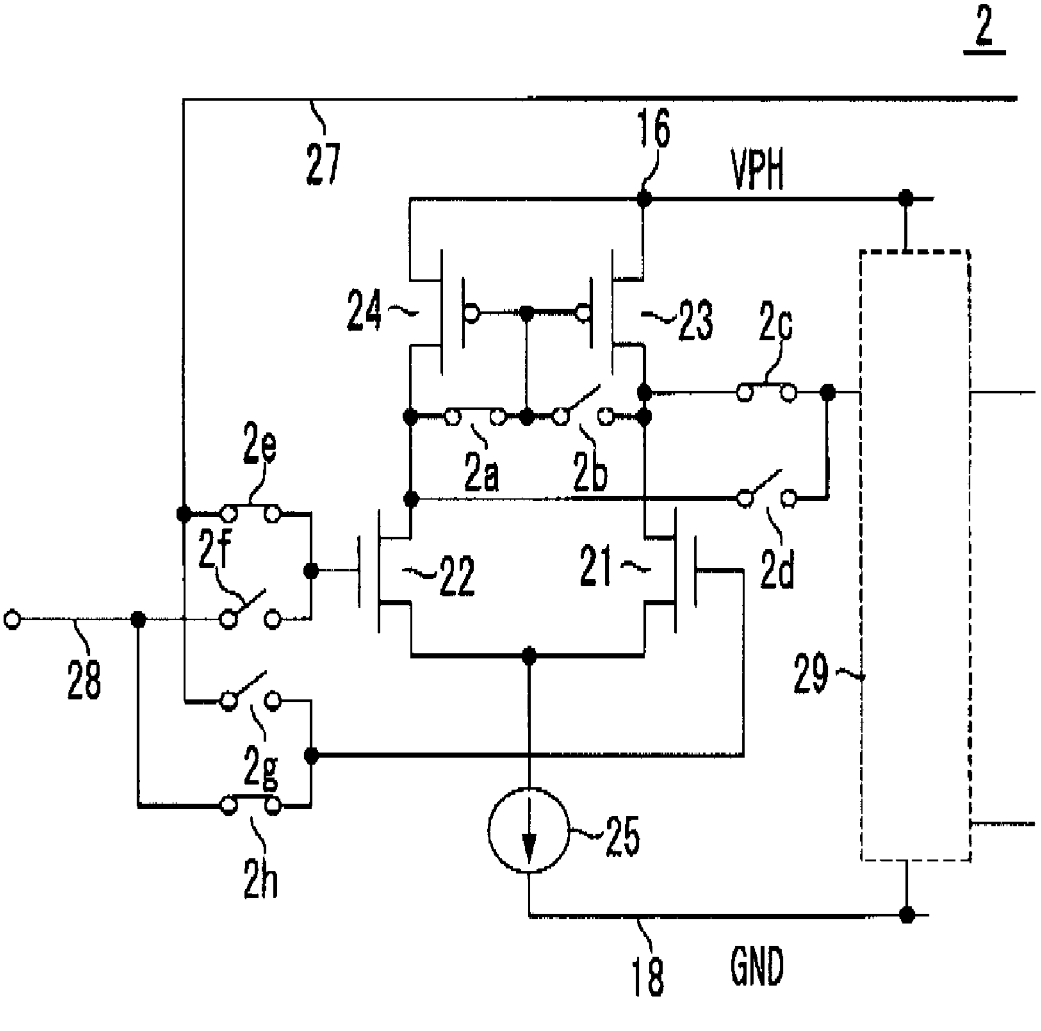
FIG. 13 is a circuit diagram illustrating still another structure of the differential amplifier stages of the drive circuit in the first embodiment.
Figure 14:
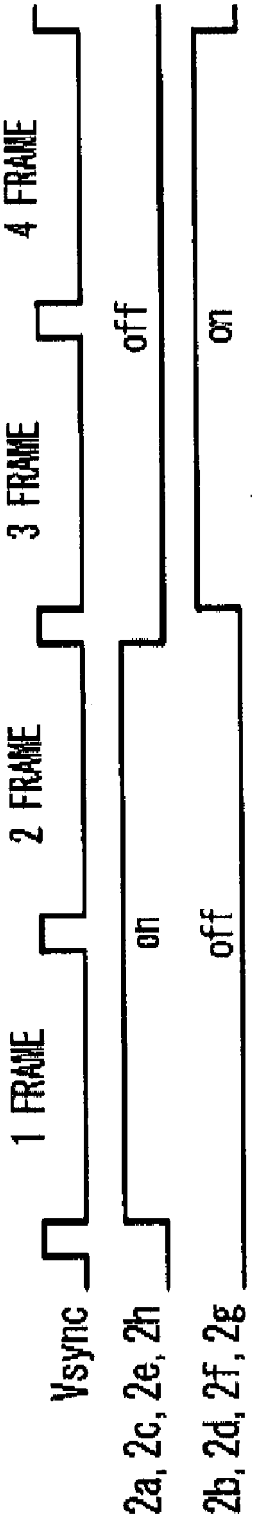
FIG. 14 is a timing chart illustrating the operation of the differential amplifier stages.

In addition, in order to reduce variations in the output voltages of the voltage followers, the inputs signals inputted to the differential amplifier stages 2 and 3 are switched to temporally average the offset voltages of the voltage followers at a cycle of a plurality of frame periods, the number of the frame periods within each cycle being a multiple of four, FIG. 13 illustrates a circuit for switching input signals fed to the input transistor of the differential amplifier stage 2, and FIG. 14 illustrates a timing chart thereof. It should be noted that FIG. 13 illustrates the circuit configuration in which the output stages 6 to 9 are composed of push-pull amplifiers and an intermediate stage 29 is additionally prepared. When the switches 2*a*, 2*c*, 2*e* and 2*h* are turned on, the transistor 22 functions as an inverting input and the transistor 21 functions as a non-inverting input. When the switches 2*b*, 2*d*, 2*f*, and 2*g* are turned on, on the other hand, the transistor 21 functions as an inverting input and the transistor 22 functions as a non-inverting input. The differential amplifier stage 3 may be structured and operated, identically. Although the switches 2*a* to 2*h* are switched every two frame periods in the operation shown in FIG. 14, the switches 2*a* to 2*h* may be switched every two lines and every two frame periods. This allows temporally averaging the offset voltages of the differential amplifier stages 2 and 3 at a cycle of four frame periods, which cycle is determined on the basis of the number of the combinations of the polarities of the pixel voltages (positive and negative) and the polarities of the differential amplifier stages 2 and 3 (inverting input or non-inverting input).

In the drive circuit 1 in this embodiment, a pair of output stages operated in different voltage ranges are prepared for each display output terminal, and the output stages are controlled in response to control signals. Additionally, switch stages are provided between the differential amplifier stages and the output stages to select the output stages. This effectively reduces the output on-resistance, and thereby effectively reduces the heat generation within the drive circuit 1.

Within a conventional drive circuit, the size of the transistors used as the switches are increased to reduce the output impedance; the reduction of the output impedance is important for completing the drive of the data signals within a restricted period of time. Although suffering from the increase in the number of the elements, especially in the switch stages, the circuit configuration of the drive circuit 1 in this embodiment allows largely reducing the size of the transistors therein, compared to the switch 123 within the conventional drive circuit shown in, FIG. 1, since the switches 41 and 42, for example, only requires a drive capacity sufficient to drive the node 63. Additionally, the size of the switches 41 and 42 can be further reduced, since the voltage swing width of the node 63 is smaller than the voltage swing width of the data lines. The voltage swing width of the data lines is typically 10 V, and the voltage swing width of the node 63 is smaller than 10 V. Additionally, middle-voltage transistor elements are used as the switches 41 and 42. Therefore, the drive circuit 1 in this embodiment effectively reduces the heat generation therein with the reduced circuit size and output impedance, compared with the conventional drive circuit.

Second Embodiment

In a large-scale liquid crystal television, having, for example, a screen size of 40 inch, data lines has a capacity of 200 pF or more. Therefore, the output impedances of the drive circuit are reduced to rapidly drive the data lines. However, the drive circuit 1 in the first embodiment (in which the output stages do not adopt the push-pull amplifier structure) suffers from the fact that the positive data signals generated by the output stages 6 and 8 exhibit the overshoot, and the negative data signals generated by the output stages 7 and 9 exhibit the undershoot, when the differences are small between the original and desired voltage levels of the data lines. However, the voltage levels of the data lines may not be stabilized to desired voltage levels after the overshoot or undershoot within a desired time period, when the currents J generated by the constant current sources are insufficient.

In order to solve this problem, the drive capacities of the output stages 6 to 9 are increased when the differences are large between the original and desired voltage levels of the data lines, and the drive capacities of the output stages 6 to 9 are decreased when the differences are small between the original and desired voltage levels of the data lines.

In the following, the display data are assumed to be 8-bit digital data composed of data bits D7, D6, D5, D4, D3, D2, D1 and D0. The data bit D7 is defined as the MSB (most significant bit), and the data bit D0 is defined as the LSB (least significant bit). Additionally, the liquid crystal display panel to be driven is assumed to be a normally black liquid crystal display panel, since a large-scale liquid crystal television usually uses a normally black liquid crystal display panel from the viewpoint of the large view angle. In the normally black liquid crystal display panel, a pixel exhibits the lowest transparency (or the "black" display), when the drive voltage of 0 V is applied to the pixel, and the pixel exhibits the highest transparency (or the "white" display), when the maximum drive voltage is applied to the pixel. Additionally, a display data of "00000000" is defined as indicating the "black" display, while display data of "11111111" is defined as indicating the "white" display.

In one embodiment, the highest bit of the display date is used to determine whether the associated pixel is in a region of the "while" display, or in a region of the "black" display, FIG. 15 illustrates a circuit configuration of the output stage 6 designed to use the highest bit (D7) of the display data for the determination. The output stage 6 shown in FIG. 15 is provided with a pair of transistors 61*a* and 61*b* connected in parallel. When the transistors 61*a* and 61*b* has the same size, the drive capacity of the output stage 6 in the "white" display can be increased up to twice of that in the "black" display.

Additionally, the current level of the constant current source is reduced down to J/m in the "while" display, where J is the current level of the constant current source in the "black" display, since the "black" display is often accompanied by the overshoot. In this case, transistors 62*a* and 62*b*, which function as constant current sources, may be connected in parallel. When the transistors 62*a* and 62*b* has the same size, the constant current level with the output stage 6 in the "white" display can be decreased down to half of that in the "black" display.

FIG. 16 illustrates a circuit configuration of the output stage 6 designed to use the upper two bits (D7 and D6) of the display data for the determination of the "white" or "black" display. The drive capacity of the output stage 6 is switched in response to the most significant bit D7, as is the case of the circuit configuration shown in FIG. 15. Additionally, the current level of the constant current source is switched in response to the second most significant bit D6. When the upper two bits of the display data are "00", the output stage 6 is operate to achieve the "black" display, with the drive capacity of K and the constant current level of J. When the upper two bits of the display data are "01", the output stage 6 is operate to achieve a middle grayscale level relatively close to the "black" display, with the drive capacity of K and the constant current level of J/m. When the upper two bits of the display data are "10", the output stage 6 is operate to achieve a middle grayscale level relatively close to the "white" display, with the drive capacity of n×K and the constant current level of J. When the upper two bits of the display data are "11", the output stage 6 is operate to achieve the "white" display, with the drive capacity of n×K and the constant current level of J/m.

Alternatively, tour transistors 61*a*, 61*b*, 61*c* and 61*d* (the transistors 61*c* and 62 are not shown) may be connected in parallel. In one embodiment, the transistors 61*a*, 61*b*, 61*c* and 61*d* are designed to have the same size. In this case, the transistors 61*a*, 61*b*, 61*c* and 61*d* are operated when the upper two bits of the display data are "01", so that the drive capacity of the output stage 6 is increased up to twice of that in the case that the upper two bits are "00". When the upper two bits are "10", the transistors 61*a*, 61*b*, 61*c* and 61*d* are operated so that the drive capacity of the output stage 6 is increased up to triple of that in the case that the upper two bits are "00". Finally, when the upper two bits are "11", the transistors 61*a*, 61*b*, 61*c* and 61*d* are operated so that the drive capacity of the output stage 6 is increased up to four times of that in the case that the upper two bits are "00". The transistors 61*a*, 61*b*, 61*c* and 61*d* may be designed to have different sizes to achieve weighting. Additionally, the output stage 6 may be designed so that the output stage 6 exhibits the overshoot when the difference between the original and desired voltage levels of the associated data line is large, while exhibiting no overshoot when the difference between the original and desired voltage levels of the associated data line is small.

It should be noted that the output stages 7, 8 and 9 may be designed to change the drive capacity thereof in response to the upper bit(s) of the display data, as is the case of the output stage 6.

It is apparent that the present invention is not limited to the above-described embodiments, which may be modified and changed without departing from the scope of the invention.

What is claimed is:

1. A display panel drive circuit comprising:

a first display output terminal to be connected with a data line of a display panel;

a first output stage connected with said first display output terminal and configured to generate and output a data signal having positive polarity with respect to a standard voltage level;

a second output stage connected with said first display output terminal and configured to generate and output a data signal having negative polarity with respect to said standard voltage level;

a first differential amplifier stage receiving a first grayscale voltage associated with a first display data;

a second differential amplifier stage receiving a second grayscale voltage associated with a second display data;

a first switch stage including a first switch and a second switch for connecting a controlling terminal of said first output stage with one of an output of said first differential amplifier stage and a first voltage level;

a second switch stage including a third switch and a fourth switch for connecting a controlling terminal of said second output stage with one of an output of said second differential amplifier stage and a second voltage level; and a control circuit controlling said first and second output stages so that one of said first and second output stages is selectively activated while the other of said first and second output stages is deactivated, wherein:

the first switch stage further includes a fifth switch for selectively connecting an output of the first output stage to an input of the first differential amplifier, the second switch stage further includes a sixth switch for selectively connecting an output of the first output stage to an input of the second differential amplifier, the first output stage comprises a first transistor, the second output stage comprises a second transistor, the controlling terminal of the first output stage controls a switching on or off of the first transistor, the controlling terminal of the second output stage controls a switching on or off of the second transistor, the first voltage level is higher than the second voltage level, the first switch connects the output of the first differential amplifier with the controlling terminal of the first output stage during a first time period, the second switch connects the first voltage with the controlling terminal of the first output stage during a second time period, and the fifth switch is on during the first time period and off during the second time period, and the sixth switch is off during the first time period and on during the second time period.

2. The display panel drive circuit according to claim 1, further comprising:

a second display output terminal to be connected with another data line of said display panel;

a third output stage connected with said second display output terminal and configured to generate and output a data signal with the positive polarity with respect to said standard voltage level; and a fourth output stage connected with said second display output terminal and configured to generate and output a data signal with the negative polarity with respect to said standard voltage level, wherein said control circuit controls said third and fourth output stages so that one of said third and fourth output stages is selectively activated while the other of said third and fourth output stages is deactivated, and wherein said control circuit controls said first to fourth output stages, so that, within a first period, said first output stage outputs a positive data signal onto said first display output terminal, and said fourth output stage outputs a negative data signal onto said second display output terminal, and that, within a second period, said second output stage outputs a negative data signal onto said first display output terminal, and said third output stage outputs a positive data signal onto said second display output terminal.

3. The display panel drive circuit according to claim 2 wherein:

said first switch stage connects the output of said first differential amplifier stage with an input of selected one of said first and third output stages; and said second switch stage connects an output of said second differential amplifier stage with an input of selected one of said second and fourth output stages.

4. The display panel drive circuit according to claim 3, wherein each of said first and second differential amplifier stages includes a pair of non-inverting and inverting inputs, wherein said first differential amplifier stage is configured to receive said first grayscale voltage on a first input selected out of said non-inverting and inverting inputs thereof, wherein said second differential amplifier stage is configured to receive said second grayscale voltage on a first input selected out of said non-inverting and inverting inputs thereof, wherein said first switch stage is configured to connect one output terminal out of said first and second display output terminals with a second input selected out of said non-inverting and inverting inputs of said first differential amplifier stage, and wherein said second switch stage is configured to connect the other output terminal out of said first and second display output terminals with a second input selected out of said non-inverting and inverting inputs of said second differential amplifier stage.

5. The display panel drive circuit according to claim 4, further comprising:

a first selector switching connections of a first node receiving said first grayscale voltage and said one output terminal with said non-inverting and inverting inputs of said first differential amplifier stage, and a second selector switching connections of a second node receiving said second grayscale voltage and said other output terminal with said non-inverting and inverting inputs of said second differential amplifier stage.

6. The display panel drive circuit according to claim 5, wherein said connections switched by said first and second selectors are switched every line and/or every frame period.

7. The display panel drive circuit according to claim 3, wherein said first differential amplifier stage, said first and third output stages operate in a first voltage range from said standard voltage level to a first voltage level higher than said standard voltage level, and wherein said second differential amplifier stage, said second and fourth output stages operate in a second voltage range from a second voltage level to said standard voltage level, said second voltage level being lower than said standard voltage level.

8. The display panel drive circuit according to claim 3, wherein a thickness of gate dielectrics of MOS transistors within said first and second differential amplifier stages is thinner than that of MOS transistors within said first to fourth output stages.

9. The display panel drive circuit according to claim 2, wherein said first to fourth output stages are configured to precharge said first and second display output terminals to said standard voltage level.

10. The display panel drive circuit according to claim 1, wherein the first output stage does not generate the data signal having the positive polarity when the first output stage is deactivated, and the second output stage does not generate the data signal having the negative polarity when the second output stage is deactivated.

* * * * *